Feb. 22, 1966 S. GREENBERG 3,237,087

REGULATION CIRCUIT WITH A ZENER DIODE PROTECTING
A PLURALITY OF SERIES CONNECTED TRANSISTORS

Filed June 21, 1961

INVENTOR.
SOL GREENBERG
BY
Morgan, Finnegan, Durham & Pine
ATTORNEYS.

United States Patent Office 3,237,087
Patented Feb. 22, 1966

3,237,087

REGULATION CIRCUIT WITH A ZENER DIODE PROTECTING A PLURALITY OF SERIES CONNECTED TRANSISTORS

Sol Greenberg, Port Washington, N.Y., assignor to Lambda Electronics Corporation, Huntington, N.Y., a corporation of New York Filed June 21, 1961, Ser. No. 118,639
2 Claims. (Cl. 323—22)

This invention relates to means for protecting electrical components and more particularly to means for protecting circuit element such as transistors from excessive voltage.

The susceptibility of certain solid state semi-conductor elements to damage caused by excessive voltage is well known. Many transistors, for example, suffer breakdown in the presence of excessive electrode voltages, e.g., excessive emitter-collector voltages.

Voltages in excess of rated values generally occur as a consequence of a failure in some circuit element which results in the application of an excessive potential to certain terminals of the transistor. This can also occur by reason of a fluctuation in supply voltage or load magnitude.

Known devices and arrangements for preventing the application of excessive voltages and currents generally function in the presence of these abnormal conditions to completely disconnect the protected device or circuit from the source of the hazard. In many cases these protective mechanisms are also required to carry all or at least the excess of current occurring during the abnormal condition.

It is thus an object of the invention to provide means for automatically limiting terminal voltages of transistors and the like without the need for disconnecting the transistor from the system in which it operates.

Another object of the invention is to provide means for automatically protecting electrical components such as transistors from excessive terminal voltages and currents without at the same time terminating the function of the protected component.

A still further object of the invention is to provide provide means whereby upon the occurrence of a fault or operating failure in a circuit, the components thereof such as transistors and other multi-terminal elements are protected from consequent failure while concurrently, the circuit is still capable of performing its basic functions.

A still further object of the invention is to provide protection means for preventing the application of an excessive voltage to the terminals of transistors and the like without requiring the protection means to carry the load normally carried by the transistors or other protected components.

A still furthe robject of the invention is to provide such protection means which, while connected to but one transistor, simultaneously protect an entire network of transistors.

A still further object of the invention is to provide simple solid-state protection means for protecting transistors and the like from excessive voltage while concurrently permitting continued operation of the transistors.

A further object of the invention is to provide such protection means in regulated power supply systems.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention comprises voltage responsive means in the collector-base circuit of a transistor, which means, while permitting continued operation of the transistor, prevent the application of excessive voltage to the emitter-collector circuit of said transistor.

The invention consists in the novel parts, constructions, arrangements, combinations and improvements herein shown and described.

Serving as illustrations of exemplary embodiments of the invention are the drawings of which:

Figure 1:
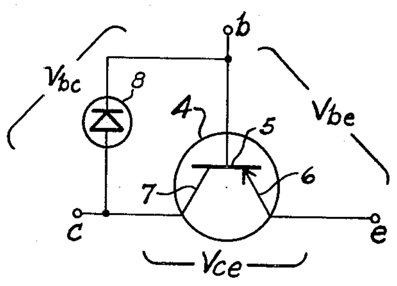
FIGURE 1 is a schematic diagram of an embodiment of the invention employed in connection with a transistor.

As illustrated in FIGURE 1, a PNP transistor 4 comprising a base 5, emitter 6 and collector 7 is provided, these elements being connected to respective transistor terminals *b*, *e* and *c*. Connected between the base terminal *b* and the collector terminal *c* are voltage responsive means including a Zener diode 8, the cathode of which is connected to the control or base terminal *b* and the anode of which connects to the collector terminal *c*. The illustrated connection applies to PNP transistors. For protecting NPN transistors according to the invention, the Zener diode is reversed with the anode thereof being connected to the base and the cathode to the collector. In either application a resistance serially connected to the Zener is sometimes desired where the Zener resistance is not optimum.

In a typical application a voltage source and load are connected between the emitter and collector, these thus serving as output terminals. The current flow from emitter to collector is to be controlled according to some function of a current supplied to the base terminal *b*. In such an application a variation in the quantity to be controlled causes a related variation in the base current; the base current change causes in turn a related change in the emitter-collector resistance thereby controlling the load current or voltage.

If for any reason the base current should take on a value where the effective emitter-collector resistance exceeds normal values, then the voltage between emitter and collector, $v_{ce}$, will tend to rise. This rise can also be produced by other factors such as an abnormal load or source fluctuation. If the rise is sufficient, the transistor may become permanently damaged.

This action is prevented by the operation of Zener diode 8. As voltage $v_{ce}$ rises, a related rise occurs in the voltage, $v_{bc}$, across the Zener diode, since $v_{bc}=v_{ce}-v_{be}$. Generally $v_{be}$ is small compared with $v_{ce}$ so that $v_{bc}$, the Zener diode voltage, is comparable to $v_{ce}$. When the rise across diode 8 reaches a predetermined value, the diode breaks down and conducts in the back direction, thereby preventing a further rise. This limiting voltage across the Zener diode in effect clamps the transistor emitter-collector, thus preventing a further rise in voltage $v_{ce}$. Accordingly, a malfunction which tends to cause a loss of forward biasing of the emitter-base circuit is counteracted by virtue of forward conduction from emitter to base and through the Zener diode. This forward biasing is maintained in spite of the fault; the transistor continues to conduct and the emitter-collector voltage by proper selection of the Zener is limited to a value close to the breakdown voltage of the Zener diode. Further, by virtue of its connection between the base and collector of the transistor, the Zener is not required to carry the total collector current, but rather a fraction thereof which depends on the forward gain of the transistor.

Figure 2:
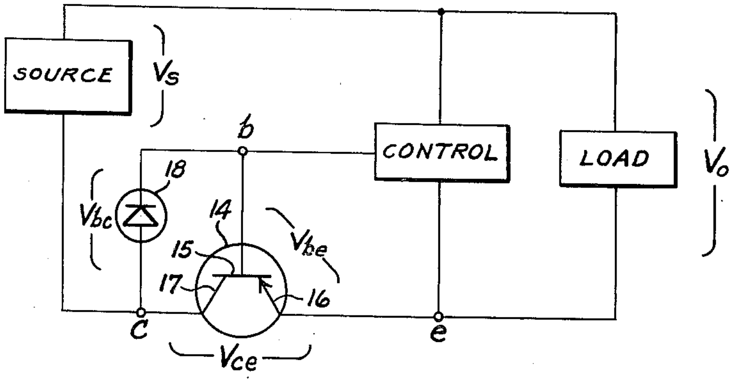
FIGURE 2 is a schematic circuit diagram illustrating the embodiment of FIGURE 1 in a typical series-regulated type power supply arrangement.

A typical application employing the arrangement of FIGURE 1 is shown in the simplified version of a regulated D.C. power supply illustrated in FIGURE 2. The load section of this power supply comprises the series connection of the source, the load, and the emitter-collector circuit of transistor 14. By controlling the effective resistance between the emitter 16 and collector 17, the voltage supplied to the load from the source is controlled. A similar system can be used for control of current to the load. For controlling transistor 14 a control circuit is provided which is responsive to the load voltage $v_o$ and which includes a standard or reference circuit for developing a voltage of predetermined, substantially constant value. The control circuit, of known construction, also includes a comparator or error detecting circuit which compares the load voltage with the reference voltage. Fluctuations in the load voltage produce error signals which cause in turn a variation in the base current delivered to the base 15 of transistor 14 from the control circuit. The power supply described thus far is typical of many known arrangements. See, for example, Henney, Keith, "Radio Engineering Handbook," 5th ed., McGraw-Hill, 1959, pages 10–34, 35, and Hunter, L. P., "Handbook of Semi-conductor Electronics," 1st ed., McGraw-Hill, 1956, pages 13–26 to 28.

In a manner similar to the arrangement shown in FIGURE 1, the cathode of a Zener diode 18 is connected to the base 15 while the anode of the diode is connected to the collector 17. As noted hereinbefore, these connections are reversed for NPN configurations. The voltage $v_{ce}$ across the emitter-collector circuit of transistor 14 represents the difference between the source voltage $v_s$ and the load voltage $v_o$. In the event of a malfunction, e.g., a failure in the control circuit whereby the base current of transistor 14 falls to an abnormally low value, then the collector-emitter circuit would tend to cut off and the voltage $v_{ce}$ would thus tend to rise. If unchecked, $v_{ce}$ would approach the value of voltage $v_s$ and if $v_s$ were sufficiently large, the transistor 14 would fail. However, as the voltage $v_{ce}$ rises, a corresponding voltage rise occurs across Zener diode 18. When the voltage across diode 18 reaches the Zener value, the diode conducts in the back direction and proper emitter-base forward conduction is restored. The voltage $v_{ce}$ therefore levels at a value determined by the breakdown voltage of the Zener whereby damage to the transistor 14 is prevented. As in the case of FIGURE 1, the transistor 14, and not the Zener, carries the principal component of the load current.

In addition to providing the transistor protection described above, the circuit of FIGURE 2 is also prevented from developing excessive output voltages which might otherwise damage load circuitry. Thus assume $v_{ce}$ has some operating value, $v_{ce}'$, which corresponds with some nominal load voltage, $v_o'$ ($v_{ce}'=v_s-v_o'$). If the Zener diode is selected to have a breakdown voltage somewhat larger than $v_{ce}'$, say $v_{ce}'+v_d$, then at breakdown the output voltage will be approximately ($v_o'-v_d$). Thus the output voltage will be less than the nominal value of output voltage by some value, $v_d$. Possibilities of damaging the load are thus eliminated by selecting an appropriate value for $v_d$.

By way of example assume the following nominal conditions $$v_s=100 \text{ volts}$$
$$v_o'=75 \text{ volts}$$
$$v_{ce}'=25 \text{ volts}$$

Assume further that $v_{be}<<v_{ce}$.

If the Zener is selected to have a breakdown value $$v_z=35 \text{ volts (i.e., } v_d=10 \text{ volts)}$$

then at breakdown $$v_{ce}=35 \text{ volts}$$

therefore $$v_o=65 \text{ volts}$$

Thus the output, $v_o$, is slightly less than the nominal operating value. The possibility of damage to the load under these conditions is thereby minimized.

A particularly significant feature of the invention is evident in circuits employing a plurality of control transistors in series, parallel, or series-parallel combinations. One such series-parallel arrangement is evident in FIGURE 3 where three groups or branches, each comprising three series-connected transistors, 24*a*, 24*b* and 24*c*, are connected in parallel.

Each of the series-connected transistors comprise a base 25, emitter 26 and collector 27. The emitter-collector circuits 26, 27, in each group are series-connected and the resultant combination is serially connected in turn to a respective resistor 29. The other terminals of each resistor 29 are connected together and the resultant junction is connected to one side of the load. At the other end of this transistor network, the terminal collectors of each group are connected together and to the source via a limiting resistor 28. The other terminal of the source and the other terminal of the load are effectively connected together to form a circuit somewhat analagous to the circuit of FIGURE 2 except that a plurality of the transistors 24 replace the single transistor 14 of that figure.

For controlling the three-branch network of transistors, means responsive to a control circuit are provided, these means serving in turn to control the base current in each of the transistors 24*a*, 24*b* and 24*c*. As embodied these means comprise three emitter-followers 33, 34 and 35, the respective emitters 36, 39 and 42 of which connect respectively to one transistor 24 in each group so that each emitter follower controls three respective transistors 24, one in each group. Specifically, the bases 25 of the transistor 24*a* in each group are connected together and to a corresponding emitter 36 of follower 33; the bases 25 of transistors 24*b* and 24*c* connect respectively to the emitters 39 and 42 of the followers 34 and 35. In addition, the collector 37 of follower 33 connects to the emitter 39 of follower 34 while the collector 40 of follower 34 connects to the emitter 42 of follower 35. The collector 43 of follower 35 is connected to the junction of resistor 28 and the transistor 24 network.

The base 38 of follower 33 is energized from the control circuit, the emitter 36 being returned thereto via resistor 51.

Connected across the three-branch network of transistors 24*a*, 24*b* and 24*c* is a voltage divider comprising three series-connected resistances 48, 49, 50. The base 44 of follower 35 connects to the junction of resistances 48 and 49 while the base 41 of follower 34 connects to the junction of resistances 49 and 50.

Figure 3:
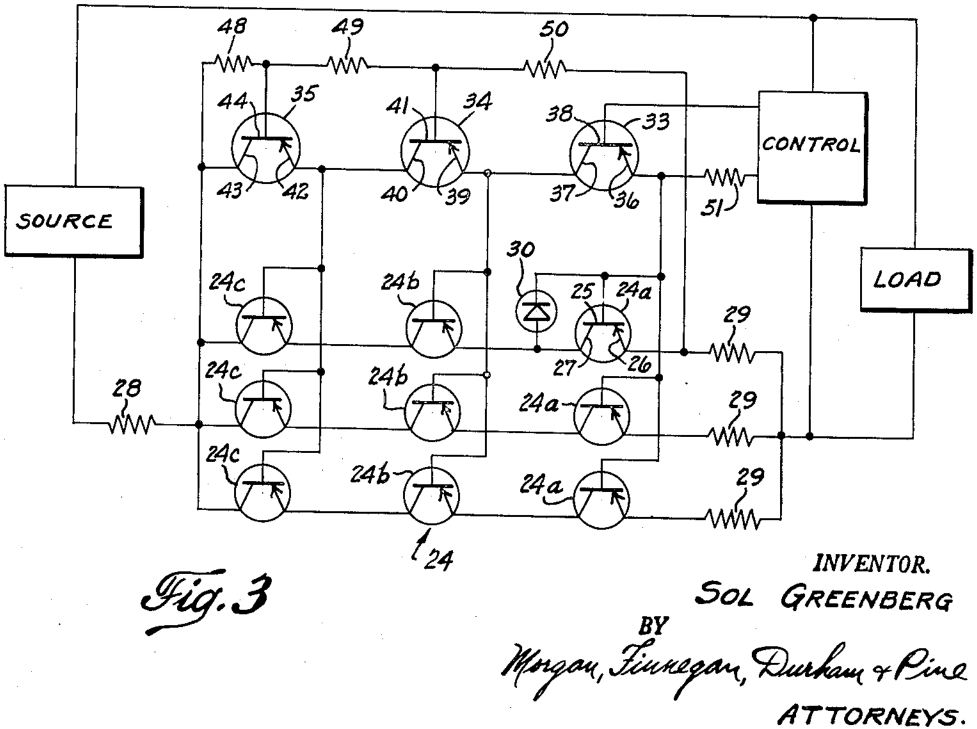
FIGURE 3 is a schematic diagram illustrating an embodiment of the invention as it would be employed in a closed loop, series-regulated type power supply having a plurality of series connected control transistors.

It may be seen from the foregoing that follower 33 responds to the control circuit and causes in turn an adjustment of the conductance of control transistors 24*a* connected thereto. Transistors 24*a* accordingly influence the voltage drop across the entire transistor network. This net voltage, however, is equally divided by divider 48, 49 and 50 so that followers 34 and 35 follow up this initial action and serve to control their respective transistors 24*b* and 24*c*. Hence, all of the transistors in the control network are adjusted to provide a net series resistance between the load and source. The symmetry and follow-up action of the circuit of FIGURE 3 is such that all of the transistors 24*a*, 24*b* and 24*c* are substantially balanced with each providing an equal contribution to the net resistance between the load and the source.

Notwithstanding a plurality of transistors 24*a*, 24*b* and 24c, they may all be protected by a single Zener diode 30, the cathode and anode of which are connected respectively to the base 25 and collector 27 of one of the transistors 24a which is driven from follower 33. In limiting the emitter-collector potential of the transistor 24a to which it connects, the Zener diode 30 limits—through the voltage division and follow-up action above described—the corresponding potential of all the transistors 24a, 24b and 24c. Further, while the net load current carried by the transistor 24 group may be substantial, the Zener diode itself is only required to carry an insignificant current. The Zener 30 can alternately be connected between the collector and base of driver 33. In addition, where protection during certain transient intervals may be required, additional Zeners may be connected between the collectors and bases of one each of transistors 24b and 24c (or the drivers 34 and 35 thereof).

The invention in its broader aspects is not limited to the specific mechanisms shown and described but departures may be made therefrom within the scope of the accompanying claims without departing from the principles of the invention and without sacrificing its chief advantages.

What is claimed is:

1. In a transistor regulated power supply the combination of a plurality of transistors each having the collector and emitter thereof operatively connected between a source of supply and a load circuit to control the current flow therebetween; a control circuit operatively connected to the base of said transistors to regulate the flow of current from the source to the load; a voltage limiting semiconductor device associated with at least one, but less than all, of said transistors; circuit means for coupling said semiconductor device between the base and collector of said associated transistor; said semiconductor device being operative to protect all of said plurality of transistors from excessive applied voltages by becoming conductive to limit the voltage appearing between the base and collector of said associated transistor when said applied voltage exceeds a predetermined value.

2. A transistor regulated power supply in accordance with claim 1 wherein said semiconductor device is a Zener diode.

References Cited by the Examiner

UNITED STATES PATENTS

| | | | |
|---|---|---|---|
| 2,655,608 | 10/1953 | Valdes | 317—33 X |
| 2,876,366 | 3/1959 | Hussey | 307—88.5 |
| 2,915,693 | 12/1959 | Harrison | 323—22 |
| 2,980,845 | 4/1961 | Thompson | 323—22 |
| 3,018,433 | 1/1962 | Stone | 323—22 X |
| 3,068,392 | 12/1962 | Stantelmann | 321—18 |
| 3,109,982 | 11/1963 | Anderson | 323—22 |
| 3,120,635 | 2/1964 | Tully | 317—33 |
| 3,151,288 | 9/1964 | Avizienis et al. | 323—22 |

FOREIGN PATENTS

| | | |
|---|---|---|
| 1,227,670 | 8/1960 | France. |
| 831,800 | 3/1960 | Great Britain. |

OTHER REFERENCES

Static D.C. References For Closed Loop Controls, M. Mamon, Electrical Manufacturing, January 1957, pp. 54–61 and 291.

LLOYD McCOLLUM, *Primary Examiner.*